(12) United States Patent
Izumiura et al.

(10) Patent No.: US 6,362,536 B1
(45) Date of Patent: Mar. 26, 2002

(54) APPARATUS AND METHOD FOR CONTROLLING POWER GENERATION FOR HYBRID VEHICLE

(75) Inventors: Atsushi Izumiura; Takashi Kiyomiya; Hideyuki Oki; Kan Nakaune; Shigetaka Kuroda; Atsushi Matsubara; Shinichi Kitajima; Hideyuki Takahashi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/634,327

(22) Filed: Aug. 7, 2000

(30) Foreign Application Priority Data

Aug. 10, 1999 (JP) ............................................. 11-226927
Aug. 10, 1999 (JP) ............................................. 11-226928

(51) Int. Cl.$^7$ ............................. F02M 51/00; H02P 9/00
(52) U.S. Cl. ................................... 290/40 C; 180/65.2
(58) Field of Search .............................. 290/40 A, 40 B, 290/40 C, 40 R, 41; 180/65.1, 65.2, 65.5; 123/319, 331

(56) References Cited

U.S. PATENT DOCUMENTS

| | | | | |
|---|---|---|---|---|
| 5,545,928 A | * | 8/1996 | Kotani | 290/40 C |
| 5,550,445 A | * | 8/1996 | Nii | 318/153 |
| 6,166,517 A | * | 12/2000 | Wakashiro et al. | 320/104 |
| 6,232,733 B1 | * | 5/2001 | Obayashi et al. | 318/432 |
| 6,262,491 B1 | * | 7/2001 | Kitajima et al. | 290/40 C |
| 6,269,290 B1 | * | 7/2001 | Egami et al. | 701/22 |
| 6,314,346 B1 | * | 11/2001 | Kitajima et al. | 701/22 |

FOREIGN PATENT DOCUMENTS

JP          07-123509          5/1995

* cited by examiner

Primary Examiner—Nicholas Ponomarenko
(74) Attorney, Agent, or Firm—Armstrong, Westerman & Hattori, LLP

(57) ABSTRACT

The present invention relates to a power generation control apparatus for a hybrid vehicle. The hybrid vehicle comprises an engine which outputs a driving force for the hybrid vehicle; a motor which outputs an assistant driving force so as to assist the driving force of the engine; a power storage unit; and a power generation control apparatus which controls the power generation by the motor. The power generation control apparatus comprises a load torque calculation device which calculates the load torque to be applied to an engine of the hybrid vehicle for generating electrical power used in the hybrid vehicle when the engine is idling; a generable torque calculation device which calculates torque generable by the engine when the engine is idling; and a power generation load torque determination device which determines a limiting value of a power generation load torque to be applied to the engine in accordance with the load torque calculated by the load torque calculation device and the generable torque calculated by the generable torque calculation device.

13 Claims, 9 Drawing Sheets

APPARATUS AND METHOD FOR CONTROLLING POWER GENERATION FOR HYBRID VEHICLE

BACKGROUND OF THE INVENTION

1. Field of the Invention

The present invention relates to an apparatus and method for controlling power generation in a hybrid vehicle which comprises an engine and an electric motor as a power source for driving the vehicle. In particular, the present invention relates to a technique for controlling power generation amount when the engine is idling.

2. Description of Related Art

Conventionally, hybrid vehicles which carry motors as power sources for driving the vehicles in addition to engines are known. Hybrid vehicles are divided into series hybrid vehicles and parallel hybrid vehicles. In the series hybrid vehicles, the engine drives a generator whose electric power output is used to drive the motor, which in turn drives the wheels. In this case, because the output of the engine is not mechanically connected to the driving wheels, the engine can be constantly driven within an engine-speed range of a high fuel mileage and a low emissions level. Therefore, the series hybrid vehicles can achieve lower fuel consumption and lower emissions levels than conventional engine vehicles.

In contrast, in the parallel hybrid vehicles, as is disclosed in Japanese Unexamined Patent Application, First Publication No. Hei 7-123509, a motor is mechanically coupled to an engine so as to assist the rotation of the drive shaft of the engine. The motor can also act as a power generator to generate electrical power, and the generated electrical energy is stored in a battery. The electrical energy charged in the battery can be supplied to electrical equipment and so on in the vehicle.

In this case, although the output of the engine is mechanically connected to the driving wheels, drive loads on the engine can be reduced. Therefore, the parallel hybrid vehicles can also achieve lower fuel consumption and lower emissions levels than conventional engine vehicles.

The parallel hybrid vehicles can be divided into several types. One is a type in which a motor is connected to an output shaft of an engine so that the motor can assist the output of the engine, and such as when the vehicle decelerates, the motor acts as a generator to charge a battery, etc. Another is a type in which both or either of a motor and an engine can generate driving force, and a generator is independently provided.

These hybrid vehicles perform various controls, for example, when the vehicle accelerates, the motor assists the output of the engine, and when the vehicle decelerates, the motor generates electric power by deceleration regeneration to charge a battery, etc. Therefore, it is possible to constantly maintain electrical energy (the remaining battery charge) in the battery and to respond to the demands by the driver of the vehicle. For example, Japanese Unexamined Patent Application, First Publication No. Hei 7-123509 discloses such a control technique.

In the above-described hybrid vehicles, when power assistance by the motor is not necessary, the motor regenerates electric power to charge a battery. This regeneration of electric power is performed not only when the vehicle decelerates but also when the engine is idling. That is, even when the engine is idling, the motor is rotated by the idling engine acting as a generator.

However, when the engine is idling, should the total torque load of the load for the power generation by the motor, the load generated by a creep state of an automatic transmission system, and the load for activating an air conditioner, etc., be greater than the torque generated by the engine, there arises a problem that the engine will stall. In particular, when the hybrid vehicle is at high altitudes, this problem occurs more easily because the intake pressure of the engine is lower. If the idling speed of the engine is increased in order to prevent the engine from stalling, there arises another problem that the fuel consumption of the engine will undesirably increase.

Moreover, when starting the vehicle from the idling state, the hybrid vehicle controls the drive motor by automatically selecting one mode from an assistance mode in which the motor assists the output of the engine in accordance with demands, and a non-assistance mode in which the vehicle runs only by the driving power from the engine while charging a battery by the motor. For example, when a relatively large torque is required at the time of starting the vehicle, the assistance mode is selected, and when large torque is not required, the non-assistance mode is selected. Accordingly, depending on the conditions, the motor performs assistance of the driving power.

However, in the case where the non-assistance mode is selected when starting the vehicle, the engine drives the motor to generate electric power, and the generated electric power is charged in the battery. Therefore, the load for driving the motor (that is, power generation torque) is applied to the engine in addition to the torque for driving the vehicle, and the problem arises that smoothness at the time of starting the vehicle will be degraded.

SUMMARY OF THE INVENTION

The object of the present invention is to provide an apparatus for controlling the power generation torque applied to an engine by a motor in accordance with a state of the hybrid vehicle.

In order to achieve the above object, a power generation control apparatus according to the first aspect of the present invention comprises: a detection device which detects a state of the hybrid vehicle in which a torque load to be applied to an engine of the hybrid vehicle should be decreased; and a generation amount control device which decreases the generation amount to be generated by a motor when the state of the hybrid vehicle is detected.

A hybrid vehicle according to another aspect of the present invention comprises: an engine which outputs a driving force for the hybrid vehicle; a motor which outputs an assistant driving force so as to assist the driving force of the engine; a power storage unit which supplies electric power to the motor when the assistant driving force is necessary, and which stores electric power generated by the motor when the assistant driving force is not necessary; and a power generation control apparatus which controls the power generation by the motor. The power generation control apparatus comprises: a detection device which detects a state of the hybrid vehicle in which a torque load to be applied to an engine of the hybrid vehicle should be decreased; and a generation amount control device which decreases the generation amount to be generated by a motor when the state of the hybrid vehicle is detected.

A power generation control method according to another aspect of the present invention comprises: a first step of detecting a state of the hybrid vehicle in which a torque load to be applied to an engine of the hybrid vehicle should be decreased; and a second step of decreasing the generation amount to be generated by a motor when the state of the hybrid vehicle is detected.

According to these aspects, a state of the hybrid vehicle in which a torque load to be applied to an engine of the hybrid vehicle should be decreased is detected, and the generation amount to be generated by a motor is decreased. Therefore, engine stall can be prevented and a smooth start of the vehicle is possible.

The another object of the present invention is to provide an apparatus for controlling the power generation torque applied to an engine by a motor in accordance with a necessary load when in an idling state.

In order to achieve the above object, a power generation control apparatus according to the first aspect of the present invention comprises: a load torque calculation device which calculates load torque to be applied to an engine of the hybrid vehicle for generating electrical power used in the hybrid vehicle when the engine is idling; a generable torque calculation device which calculates torque generable by the engine when the engine is idling; and a power generation load torque determination device which determines a limiting value of a power generation load torque to be applied to the engine in accordance with the load torque calculated by the load torque calculation device and the generable torque calculated by the generable torque calculation device.

According to this power generation control apparatus, when the torque generable by the engine is decreased in proportion to the decrease in the air-intake pressure of the engine, the power generation load torque applied to the engine by the motor is controlled so as to decrease depending on the decrease in the torque generable by the engine. Therefore, engine stall can be prevented. Additionally, in the case where the power generation by the motor decreases in accordance with the decrease in the torque generable by the engine, because the battery is used for compensating the shortage of the electric power, it is not necessary to increase the idling speed of the engine. Therefore, deterioration of the fuel consumption can be prevented.

A hybrid vehicle according to another aspect of the present invention comprises: an engine which outputs a driving force for the hybrid vehicle; a motor which outputs an assistant driving force so as to assist the driving force of the engine; a power storage unit which supplies electric power to the motor when the assistant driving force is necessary, and which stores electric power generated by the motor when the assistant driving force is not necessary; and the aforementioned power generation control apparatus which controls the power generation by the motor.

The another object of the present invention is to provide an apparatus and method for controlling the power generation in hybrid vehicles by which the smoothness of starting the vehicles can be improved even when a non-assistance mode accompanied with power generation is selected at the time of starting the vehicle.

In order to achieve the object, a power generation control method according to another aspect of the present invention comprises: a first step of detecting if the state of the engine has shifted from an idling state to a non-idling state; and a second step of temporarily decreasing the generation amount to be generated by the motor when the state of the engine is detected to have been shifted from the idling state to the non-idling state.

According to the above method, when the state of the engine is shifted from the idling state to the non-idling state, the generation amount by the motor is temporarily decreased, and the load applied to the engine by the motor for the power generation is diminished. Therefore, while the generation amount is suppressed, the load torque applied to the engine can be diminished.

The non-idling state is for example a starting state of the vehicle. In this case, the output of the engine can be effectively used for accelerating the vehicle, and it is possible to smoothly start the vehicle from the idling state.

In the first step, it is preferable to detect a starting operation for shifting a state of the engine from an idling state to a running state (mode) accompanied with power generation. In general, the charging of the battery is carried out during a running mode in which the load applied to the engine is relatively light. Therefore, for example, by detecting the change of the engine load, the starting operation at the time of shifting the driving mode from the idle mode to the running mode accompanied with power generation can be detected. In this way, by detecting that the mode is the running mode accompanied with power generation, it is possible to avoid unnecessary power generation control during a running mode which is not accompanied with power generation (for example, in the assistance mode). Therefore, control of the power generation can be effectively performed.

In the second step, it is preferable to temporarily halt the charging of the power storage unit so as to decrease the generation amount by the motor. In this case, the load applied to the engine in order to generate electric power for battery charging is omitted. Therefore, the start of the vehicle can be smooth.

A power generation control apparatus according to another aspect of the present invention comprises: a detection device which detects if the state of the engine has shifted from an idling state to a non-idling state; and a generation amount control device which temporarily decreases the generation amount to be generated by the motor when the state of the engine is detected to have shifted from the idling state to the non-idling state.

The detection device preferably detects the starting operation for shifting the state of the engine from an idling state to a running state accompanied with power generation. Preferably, the generation amount control device temporarily halts the charging of the power storage unit so as to decrease the generation amount by the motor.

According to this apparatus, when the state of the engine is shifted from the idling state to the non-idling state, the generation amount by the motor is temporarily decreased (for example, for 0.5 to 1 second), and the load applied to the engine by the motor for power generation is diminished. Therefore, while the generation amount is suppressed, the load torque applied to the engine can be diminished, and a smooth start of the vehicle is possible.

Here, in the case where the above non-idling state is the starting state, that is, in the case where the state of the engine is shifted from the idling state to the starting state, the detection of the starting state is preferably carried out as follows:

(1) The change of the mode between the idle mode and the other modes is detected.

(2) The change of a gear position to an in-gear state is detected.

(3) The release of a brake is detected.

In the case of (1), for example, it is possible to detect the starting operation in a manual transmission car which does not comprise a switch for detecting a gear position. The discrimination between the idle mode and the other mode can be carried out based on the degree of throttle opening, an air intake passage pressure, an engine speed, etc. By means of detecting the change of the driving mode based on such information, the starting operation from the idling state can be detected.

In the case of (2), for example, it is possible to detect the starting operation in an automatic transmission vehicle (a CVT vehicle or an AT vehicle) which comprises a switch for detecting a gear position. When an automatic transmission vehicle starts, because the gear position is shifted from an N-range (neutral) or a P-range (parking) to a D-range (drive), by means of detecting the change of the gear position, the starting operation from the idling state can be detected.

In the case of (3), if a brake is in an ON state, the brake will be released by a driver to start the vehicle. Therefore, by means of detecting the release of the brake, the starting operation from the idling state can be detected.

In the present invention, it is also possible to detect the starting operation based on, for example, the change of the engine load. In this case, not only the detection of the starting operation, but also non-assistance modes such as a cruise mode can be detected, and it becomes possible to control the generation amount in accordance with the driving mode.

In the present invention, the concept "starting state" includes the release of a brake, the driver's operation (starting operation) such as the shift of a gear position, and a state of the vehicle itself such as the change of the engine load. That is, the concept "starting state" includes all states of movement relating to the start of the vehicle.

Furthermore, a hybrid vehicle according to another aspect of the present invention comprises: an engine which outputs a driving force for the hybrid vehicle; a motor which outputs an assistant driving force so as to assist the driving force of the engine; a power storage unit which supplies electric power to the motor when the assistant driving force is necessary, and which stores electric power generated by the motor when the assistant driving force is not necessary; a detection device which detects if the state of the engine has shifted from an idling state to a non-idling state; and a generation amount control device which temporarily decreases the generation amount to be generated by the motor when the state of the engine is detected as being shifted from the idling state to the non-idling state.

DETAILED DESCRIPTION OF THE INVENTION

Hereinafter, the embodiments of the present invention will be explained referring to the figures.

FIRST EMBODIMENT

Figure 1:
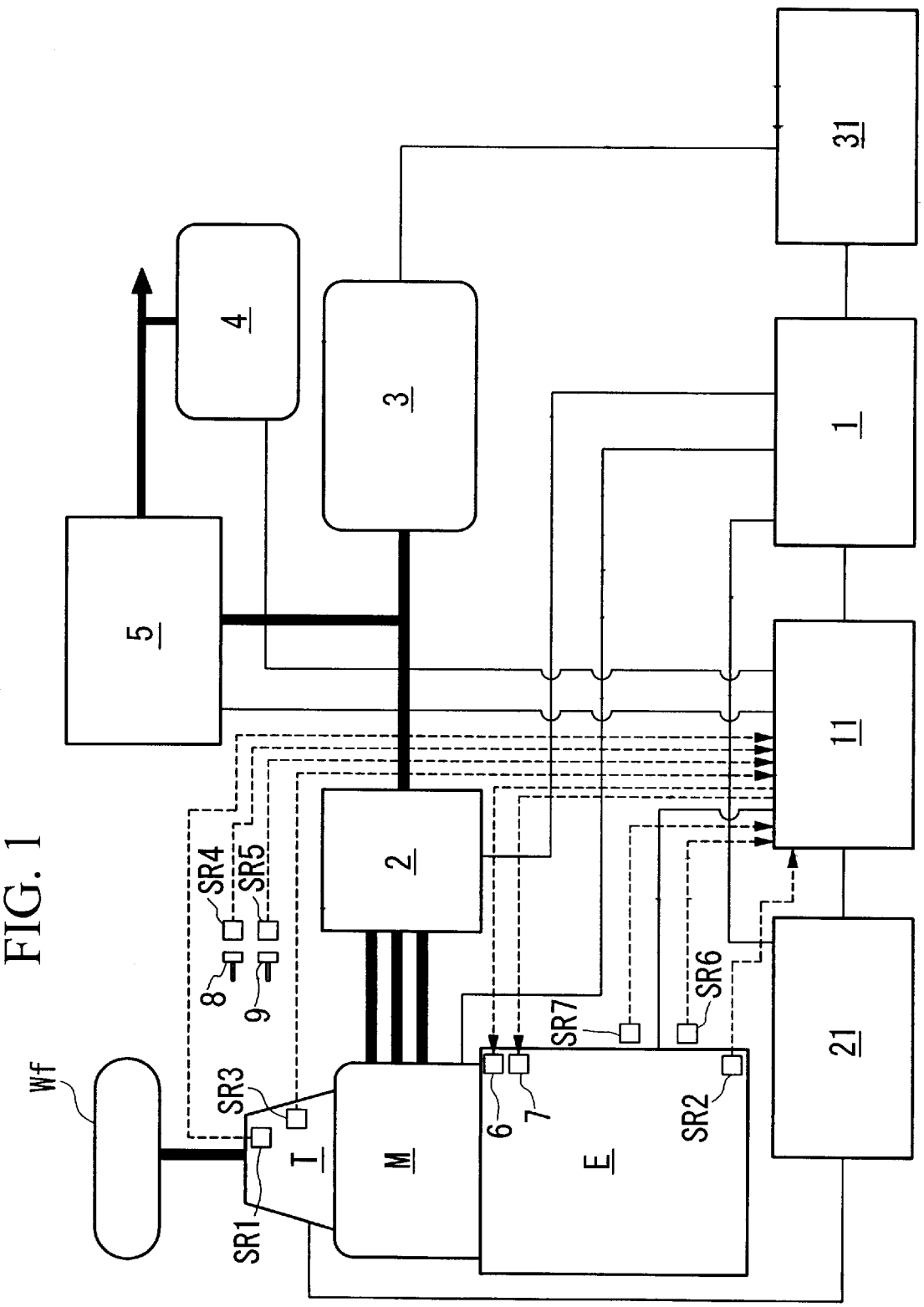
FIG. 1 is a block diagram illustrating a construction of a hybrid vehicle to which a first embodiment of the present invention is applied.

FIG. 1 is a block diagram illustrating a parallel hybrid vehicle in which the first embodiment of the present invention is applied, and the vehicle comprises an engine E and an electric motor M. The driving force generated by both the engine E and electric motor M is transmitted via automatic or manual transmission T to the driving wheels Wf. In this embodiment, a CTV (Continuously Variable Transmission) is used as the transmission T. At the time of the deceleration of the hybrid vehicle, the driving force is transmitted from the driving wheels Wf to the electric motor M, the electric motor M functions as a generator for generating what is termed regenerative braking force, that is, the kinetic energy of the vehicle body is recovered as electric energy.

The driving of the motor M and the regenerating operation of the motor M are controlled by a power drive unit 2 according to control commands from a motor ECU 1. A high voltage battery 3 for sending and receiving electric energy to and from the motor M is connected to the power drive unit 2. The battery 3 includes a plurality of modules connected in series, and in each module, a plurality of cells are connected in series. The hybrid vehicle includes a 12-V auxiliary battery 4 for driving various accessories. The auxiliary battery 4 is connected to the battery 3 via a downverter 5. The downverter 5, controlled by an FIECU 11, reduces the voltage from the battery 3 so as to charge the auxiliary battery 4.

The FIECU 11 controls, in addition to the motor ECU 1 and the downverter 5, a fuel supply amount controller 6 for controlling the amount of fuel supplied to the engine E, a starter motor 7, and ignition timing, etc. Therefore, the FIECU 11 receives (i) a signal from a speed sensor SR1 for detecting the vehicle speed based on the rotation of the drive shaft of transmission T, (ii) a signal from an engine (rotational) speed sensor SR2 for detecting the engine (rotational) speed, (iii) a signal from a shift position sensor SR3 for detecting the shift position of the transmission T, (iv) a signal from a brake switch SR4 for detecting operation of a brake pedal 8, (v) a signal from a clutch switch SR5 for detecting the operation of a clutch pedal 9, (vi) a signal from a throttle opening-degree sensor SR6 for detecting the degree of opening TH of the throttle (valve), and (vii) a signal from an air-intake passage pressure sensor SR7 for detecting the air-intake passage (negative) pressure PB.

In FIG. 1, a CVTECU 21 controls the CVT (continuously variable transmission), a battery ECU 31 protects the battery 3, and calculates the remaining capacity SOC of the battery 3.

This hybrid vehicle can enter various control modes, such as an "idle mode", a "deceleration mode", an "acceleration mode", and a "cruise mode".

Figure 4:
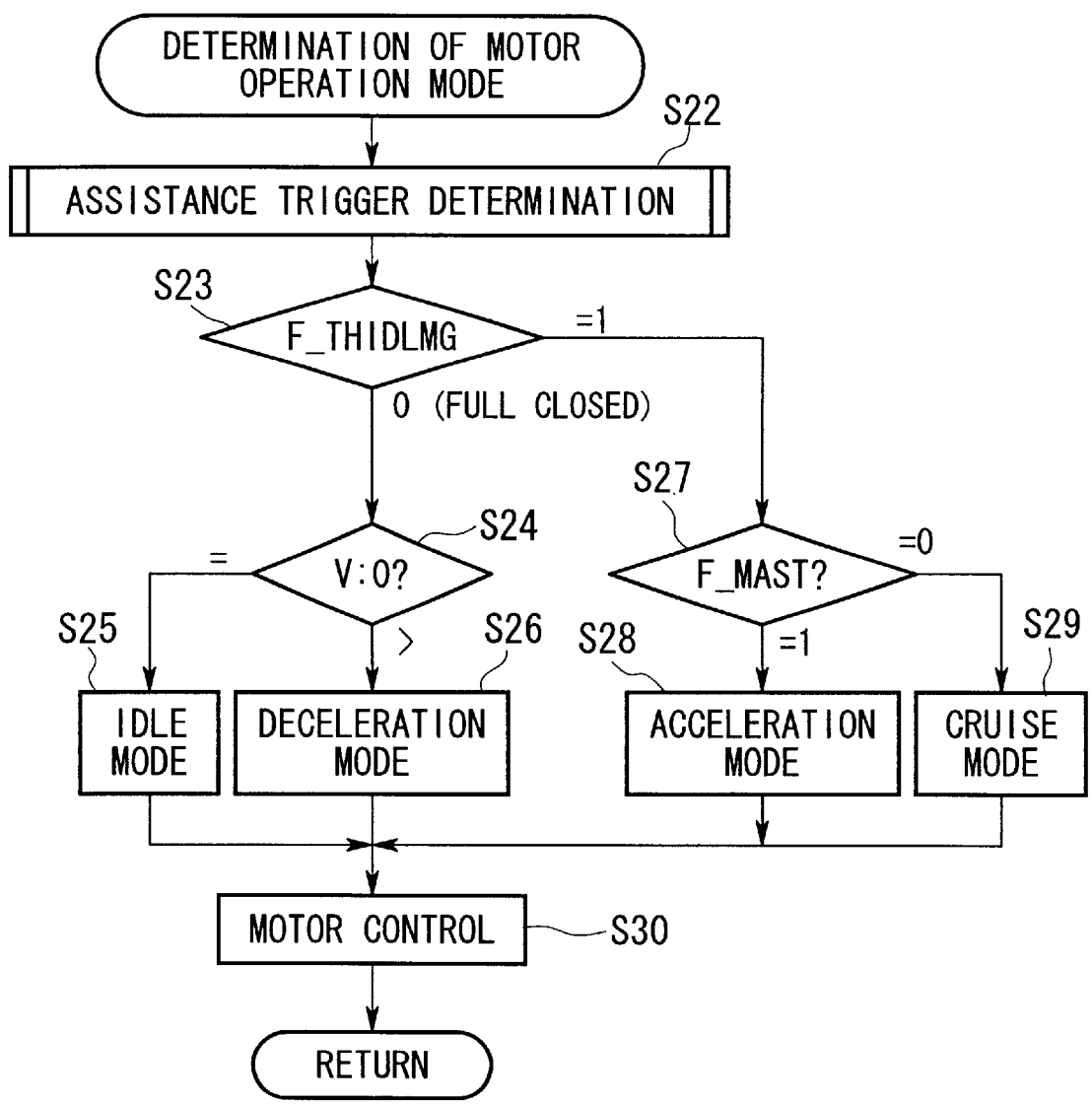
FIG. 4 a flowchart illustrating steps for determining a motor driving mode.

Referring to the flowchart shown in FIG. 4, the process for determining the above four motor control modes will be explained.

First, in step S22, an assistance trigger determination is performed. The assistance trigger determination is a procedure for determining whether the motor M should assist the output of the engine E, based on the driving conditions at the present moment. Depending on the result of this assistance trigger determination, the value of motor assistance determination flag F_MAST in step S27 is determined.

Next, in step S23, it is determined whether the throttle valve is completely closed or not based on a throttle closed determination flag F_THIDLMG. If the throttle closed determination flag F_THIDLMG is "0", that is the throttle valve is completely closed, and if the vehicle speed V detected in step 24 by the vehicle speed sensor SR1 is "0", that is the vehicle is standing, the "idle mode" is selected in step S25, and fuel supply is recommenced after the fuel supply is cut. Therefore, the engine E starts to idle and maintains that state.

In step 23, if the throttle closed determination flag F_THIDLMG is "0", that is the throttle valve is completely closed, and if the vehicle speed V detected in step 24 by the vehicle speed sensor SR1 is not "0", that is the vehicle is running, the "deceleration mode" is selected in step S26, and the regenerative braking is performed by the motor M.

In step 23, if the throttle closed determination flag F_THIDLMG is "1", that is the throttle valve is open, the flow proceeds to the step S27, and whether the vehicle is in the "acceleration mode" or the "cruise mode" is determined based on the motor assistance determination flag F_MAST.

In step S27, if the motor assistance determination flag F_MAST is "1", then the "acceleration mode" is selected in step S28, and the driving power of the engine E is assisted by the driving power of the motor M. If the motor assistance determination flag F_MAST is "0", then the "cruise mode" is selected in step S29, and the vehicle is driven by the driving power of the engine E without the driving power of the motor M. In this way, in step S30, the motor M is controlled depending on each mode.

Figure 5:
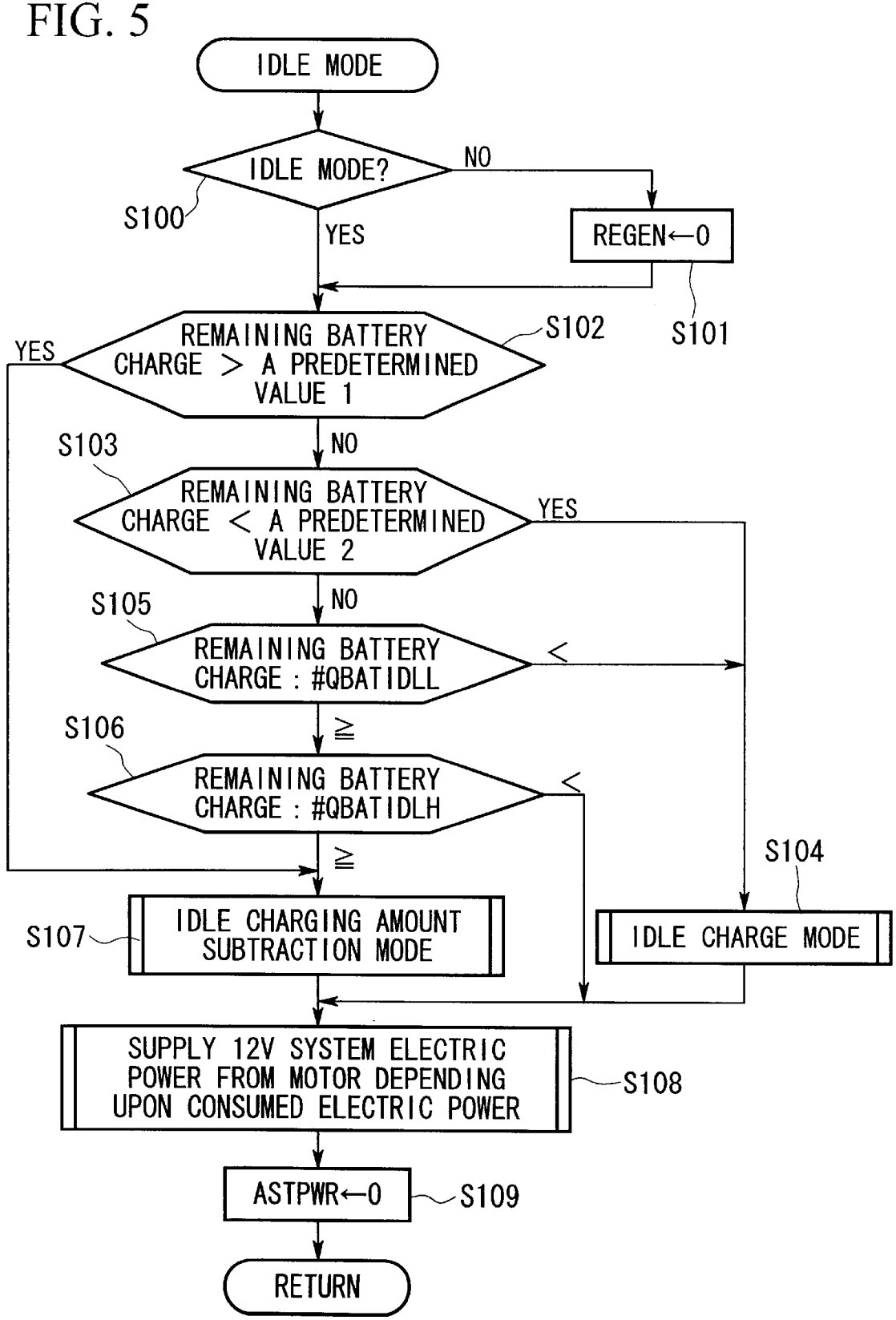
FIG. 5 is a flowchart of an idle mode of the hybrid vehicle.

Next, the idle mode shown in step S25 in FIG. 4 will be explained referring to FIG. 5. FIG. 5 is a flowchart for controlling the charging of the battery 3 in the idle mode. Steps S100 to S109 are repeatedly performed at constant intervals. This interval is determined based on the period required for performing the procedures in steps S100 to S109, etc.

First, in step S100, it is determined whether the present mode is the idle mode. If the present mode is determined to be the idle mode, the flow proceeds to step 102. If the present mode is determined not to be the idle mode, a power generation amount REGEN is set to "0" in step 101, and the flow proceeds to step 102.

Next, in step S102, it is determined whether the remaining battery charge is larger than a predetermined value "1". Based on the result of this judgment, it is determined whether the remaining battery charge is in a zone which is sufficient for the motor M to perform the power assistance for the engine E, that is, whether the remaining battery charge is sufficient. Here, the "sufficient remaining battery charge" is, for example, 40% of the full battery charge, and the value "40%" corresponds to the value "1" in step S102. If the remaining battery charge is determined to be sufficient in the above judgment, the flow proceeds to the below mentioned step S107 to enter an idle battery charge subtraction mode. The remaining battery charge is a value calculated by the battery ECU 31 based on parameters such as the voltage, the charging current, discharging current, and the temperature of the battery 3.

In step S102, the remaining battery charge is determined to not be in the sufficient zone, the flow proceeds to step S103, and it is further determined whether the remaining battery charge is less than a predetermined amount "2".

Based on the result of this judgment, it is determined whether the remaining battery charge is in an over-discharge zone, that is, in a zone in which if the battery is used further it becomes impossible to perform the drive assistance of the engine E by the motor M. The over-discharge zone is a zone in which, for example, the remaining battery charge is less than 20% of the full charge, and this value "20%" corresponds to the above mentioned value "2" in step S103. By this judgment, if it is determined to be in the over-discharge state, the flow proceeds to the next step S104 to enter into an idle charging mode.

In contrast, if it is determined to not be in the over-discharge state in step S103, the flow proceeds to step S105, and the remaining battery charge is compared with a lower judgment value #QBATIDLL which is the lower value in a hysteresis value zone including the predetermined value "1" in step S106 and predetermined margins above and below the value "1". If it is determined that the remaining battery charge is lower than the lower judgment value #QBATIDLL, the flow proceeds to step S104 to enter the idle battery charge mode.

If the remaining battery charge is determined to be greater than the lower judgment value #QBATIDLL, the flow proceeds to step 106, and the remaining battery charge is again compared with a higher judgment value #QBATIDLH which is the higher value in the hysteresis value zone. If it is determined that the remaining battery charge is lower than the lower judgment value #QBATIDLL, the flow proceeds to step S104 so as to enter the idle battery charge mode.

In this embodiment, because the lower and higher judgment value #QBATIDLH in the hysteresis value zone include the value "1" (that is, remaining battery charge 40%) and predetermined margins above and below the value "1", it is possible to prevent the hunting of the control system at the boundary region near the value "1".

In step S106, if the remaining battery charge is determined to be lower than the higher judgment value #QBATIDLH, the flow proceeds to step S108. That is, in the case where the remaining battery charge is not less than the lower judgment value #QBATIDLL and is lower than the higher judgment value #QBATIDLH, because the flow proceeds to step S108 without performing step S104 and step S107 for changing the mode, the mode used in the previous cycle is maintained.

In contrast, if the remaining battery charge is not less than the lower judgment value #QBATIDLL, the flow proceeds to the after-mentioned step S107 to enter the idle battery charge subtraction mode.

Here, the idle battery charge mode in step S104 and the idle battery charge subtraction mode will be explained briefly. The idle battery charge mode is a mode in which, when the engine E is idling, the battery 3 is charged with electric power generated by the motor M. This mode will be entered only in the case where the remaining battery charge is determined to be in the over-discharge zone in order to quickly restore the remaining battery charge.

The idle battery charge subtraction mode is a mode in which, when the engine E is idling, the electric power generated by the motor M is supplied only to a 12-V system, while stopping the charging of the battery 3. The idle battery charge subtraction mode is entered when the remaining battery charge is determined to be sufficient, in order to prevent the battery 3 from over charging when the vehicle is stopped.

After the idle battery charge subtraction mode in step S107 and the idle battery charge mode in step S104 is completed, the flow proceeds to step S108, and the motor M generates electric power corresponding to the power consumption by the 12-V system, and the generated electric power is supplied to the auxiliary battery 4. Then, in step S109, the amount of assistance is set to "0" and the flow returns to the start.

As described above, in this embodiment, it is determined whether the electric power generated by the motor M should be stored in the battery 3 based on the remaining battery charge, and, in accordance with the result, the amount of the power generation by the motor M is controlled.

Figure 2:
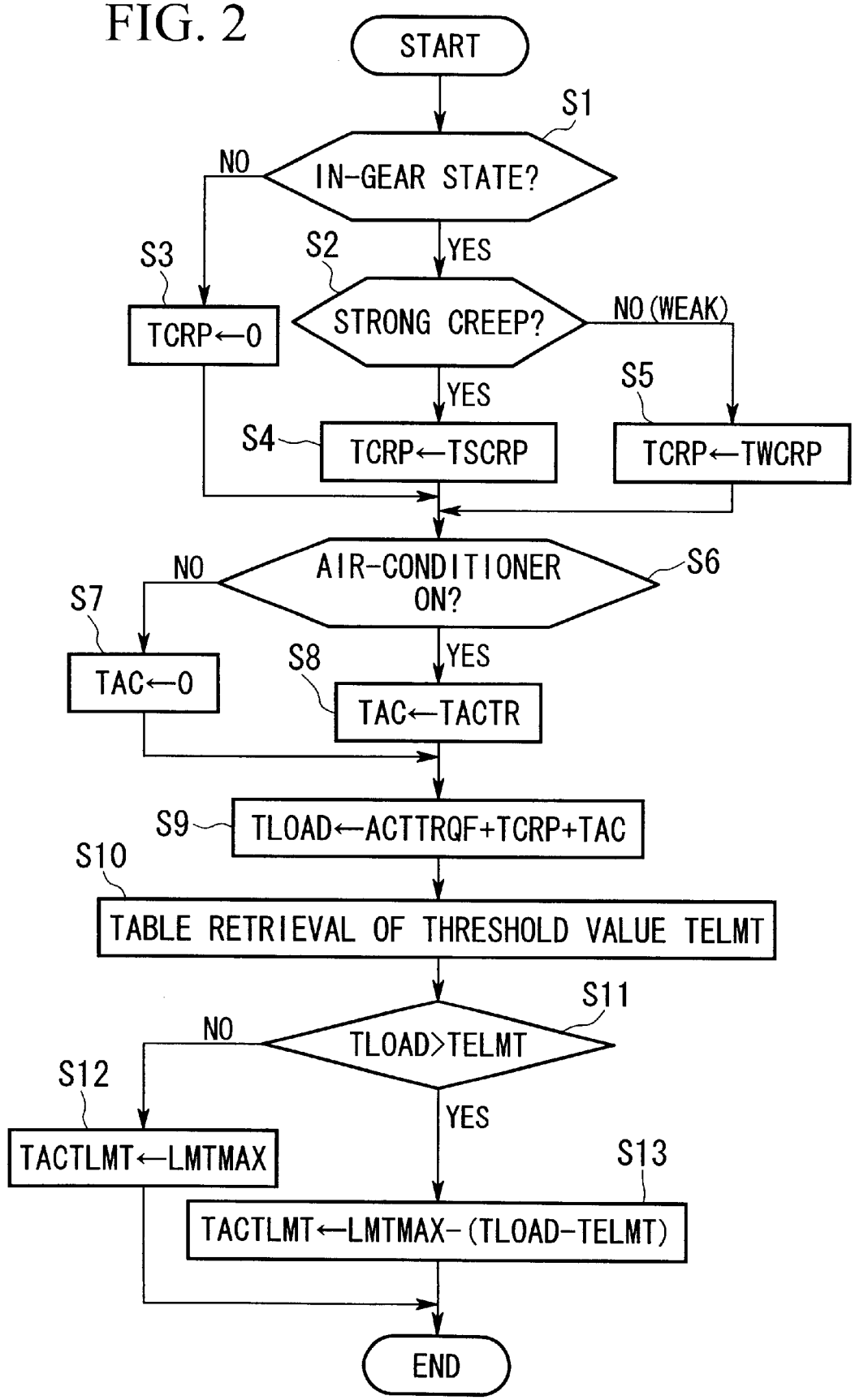
FIG. 2 is a flowchart illustrating steps for controlling limited values of power generation torque by a motor M depending on the conditions of an engine E in the first embodiment.

Next, the procedure in step S108 shown in FIG. 5 will be explained. In this step S108,: the amount of the power generation by the motor M is controlled in accordance with the condition of the engine E, in the case where the electric power generated by the motor M is supplied to the 12-V system. FIG. 2 is a flowchart illustrating the process for controlling the limiting value of the power generation torque load in accordance with the condition of the engine E. The procedures in steps S1 to S13 will be repeated at a predetermined interval. This interval is determined based on the period required for the calculation of the torque load and for setting the limiting value, and it is, for example, 10 microseconds in this embodiment.

First, in step S1, it is determined whether the present state is an in-gear state based on the signal output from the shift position sensor SR3. Here, the "in-gear state" is a state in which a shift position other than a neutral position and a parking position is selected in the CVT. If it is determined not to be an in-gear state, the flow proceeds to step S3. Also, if the transmission is a manual transmission, the flow proceeds to step S3 without exception. In step S3, if it is not an in-gear state at present, because the load applied to the engine E by the transmission T is zero, a variable TCRP is set to "0".

In contrast, if it is determined in S1 to be an in-gear state, the flow proceeds to step S2, and it is determined whether the present state is a strong creep state or not. The "creep state" is, in an automatic transmission, a state in which a vehicle slowly proceeds without treading on the accelerator when a shift position other than a normal position and a parking position is selected. The strength of creep is controlled by a CVTECU 21, for example, so that the degree of the creep is strengthen when the vehicle is climbing and is weaken when the vehicle is running on a horizontal road. In step S2, it is determined whether the creep is set to be strong or weak. If it is determined to be a strong creep state, the flow proceeds to step S4, and a variable TCRP is set to a torque load value TSCRP which is the value of the torque load generated when in a strong creep state. In contrast, if it is determined to be a weak creep state, the flow proceeds to step S5, and the variable TCRP is set to a torque load value TWCRP which is the value of the torque load generated when in a weak creep state.

After setting of the variable TCRP, the flow proceeds to step S6, and it is determined whether the air conditioner is in operation or not at the present time. If the air conditioner is in an OFF state, the flow proceeds to step S7, and a variable TAC is set to "0". On the other hand, if the air conditioner is in an ON state, the flow proceeds to step S8, and a variable TAC is set to a torque load value TACTR which is a value of the torque load of the engine E when the air conditioner is working.

Next, in step S9, a present torque load TLOAD of the engine E is calculated This torque load TLOAD is the sum of a power generation torque load ACTTRQF generated by the motor M, the torque load TCRP generated by the transmission, and the torque load TAC generated by the air conditioner. The power generation torque load ACTTRQF is a value which varies depending on the electric power required by electrical equipment in the vehicle, and the motor M generates electric power corresponding to this power generation torque load ACTTRQF to apply to the 12-V system.

Figure 3:
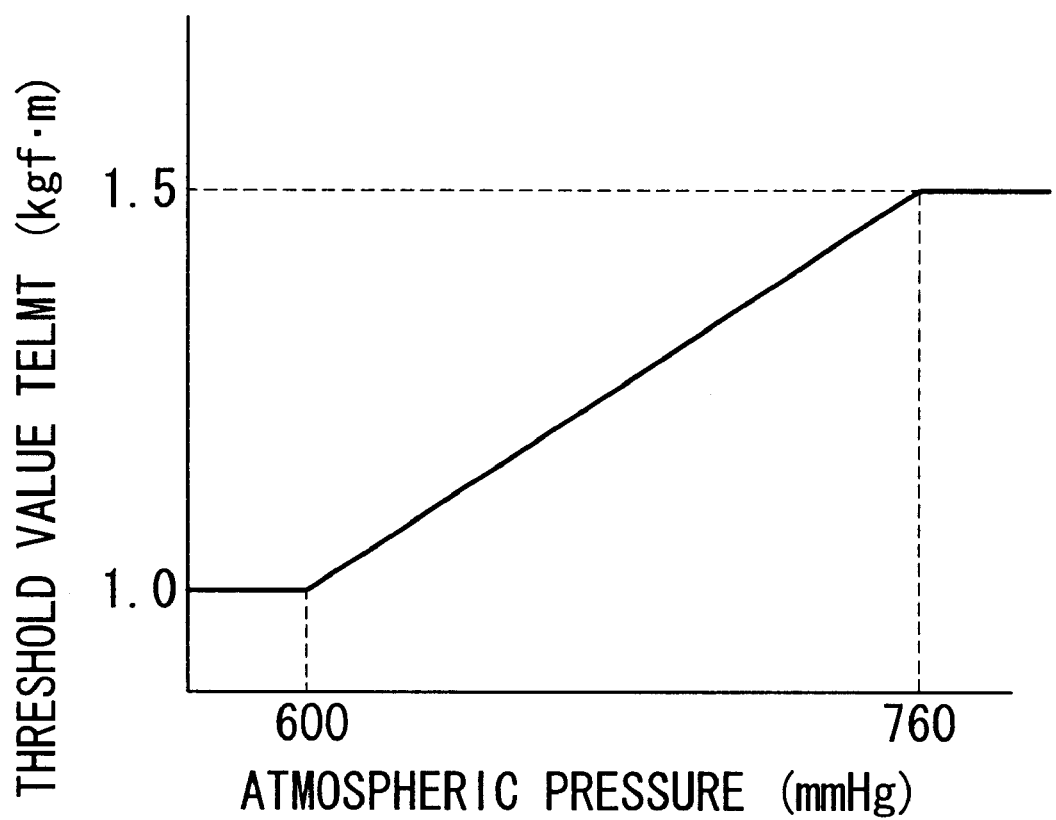
FIG. 3 is a graph illustrating the relationship between the atmospheric pressure and the maximum torque which can be generated by the engine E under atmospheric pressure.

Next, in step S10, a threshold value TELMT of a torque generable at present by the engine E is retrieved from a threshold value table. As shown in FIG. 3, the threshold value table is a table defining the relationship between an air intake passage pressure of the engine E and the threshold value TELMT of the torque which is generable by the engine E when the engine E is idling. For example, the threshold value TELMT of the generable torque is 1.5 kgf·m when the atmospheric pressure is more than 760 mmHg (this atmospheric pressure corresponds to an altitude of 0 m). The threshold value TELMT decreases in proportion to the decrease in the atmospheric pressure, and it reaches to 1.0 kgf·m when the atmospheric pressure is 600 mmHg (this atmospheric pressure corresponds to an altitude of 2000 m). The air-intake passage pressure of the engine E can be calculated based on the output of the air-intake passage pressure sensor SR7.

The threshold value TELMT of the generable torque is predetermined by the performance of the engine E, and is a torque value at which the engine E can maintain an idling rotation without stalling when a load torque no more than the threshold value TELMT is applied to the engine E.

Next, in step S11, the threshold value TELMT of the generable torque calculated in step S10 is compared to the torque load TLOAD calculated in step S9. If the torque load TLOAD required at present is not greater than the threshold value TELMT of the generable torque, the flow proceeds to step S12, and a power generation load torque limit TACTLMT is set to a maximum value LMTMAX of the power generation load torque limit to complete the flow. On the other hand, if the torque load TLOAD is greater than the threshold value TELMT of the generable torque, the flow proceeds to step S13, and the power generation load torque limit TACTLMT is set to a value obtained by subtracting the difference between the torque load TLOAD and the threshold value TELMT of the generable torque from the maximum value LMTMAX of the power generation load torque limit. That is, TACTLMT is set to (LMTMAX−(TLOAD−TELMT)). Then, the flow ends.

With regard to the motor M, the maximum limit of the power generation load torque of the motor M is determined based on the power generation load torque limit TACTLMT obtained in step S12 or S13 as shown in FIG. 2. Therefore, the motor M is controlled so as not to generate electric power beyond the maximum limit of the power generation load torque, it is thereby possible to prevented the load torque applied on the engine E from being greater than the torque generable by the engine E at present. However, in this case, because the motor M cannot supply all the electric power required in the vehicle, the shortage of electric power is supplied from the battery 3 through the downverter 5. The electric power consumed from the battery 3 will be compensated for by charging the battery 3 when the vehicle is in cruise mode or in deceleration mode.

As is explained above, in the present embodiment, when the torque generable by the engine E is decreased in proportion to the decrease in the air-intake pressure of the engine E, the power generation load torque loaded on the engine E by the motor M is controlled so as to decrease depending on the decrease in the torque generable by the engine E. Therefore, engine stall E can be prevented.

Additionally, in the case where the power generation by the motor M decreases in accordance with the decrease in the torque generable by the engine E, because the battery 3 is used for compensating the shortage of the electric power, it is not necessary to increase the idling speed of the engine E. Therefore, deterioration in the fuel consumption can be prevented.

In the above embodiment, the torque load TLOAD is calculated by totalizing the power generation load torque ACTTRQF, the torque load TCRP generated by the transmission, and the torque load TAC generated by the air conditioner. However, if there is another torque load applied to the engine E, the torque load may be further added to the torque load TLOAD. In such a case, in step S9 shown in FIG. 2, the torque load TLOAD should be modified so as to include the additional torque load.

In the above embodiment, as shown in FIG. 3, the threshold value TELMT of the torque generable by the engine E is set to gradually decrease as the atmospheric pressure decreases from 760 mmHg to 600 mmHg. However, it is also possible in the present invention to set the threshold value TELMT to one of two values by judging whether the atmospheric pressure is higher than a predetermined pressure threshold or not. That is, if the atmospheric pressure is lower than the pressure threshold, the threshold value TELMT is set to a value lower than usual without exception, and if the atmospheric pressure is lower than the pressure threshold, the threshold value TELMT is set to a higher value. In this case, the complicated table for determining the threshold value TELMT can be omitted, judgment procedures can thereby be simplified.

Second Embodiment

Figure 6:
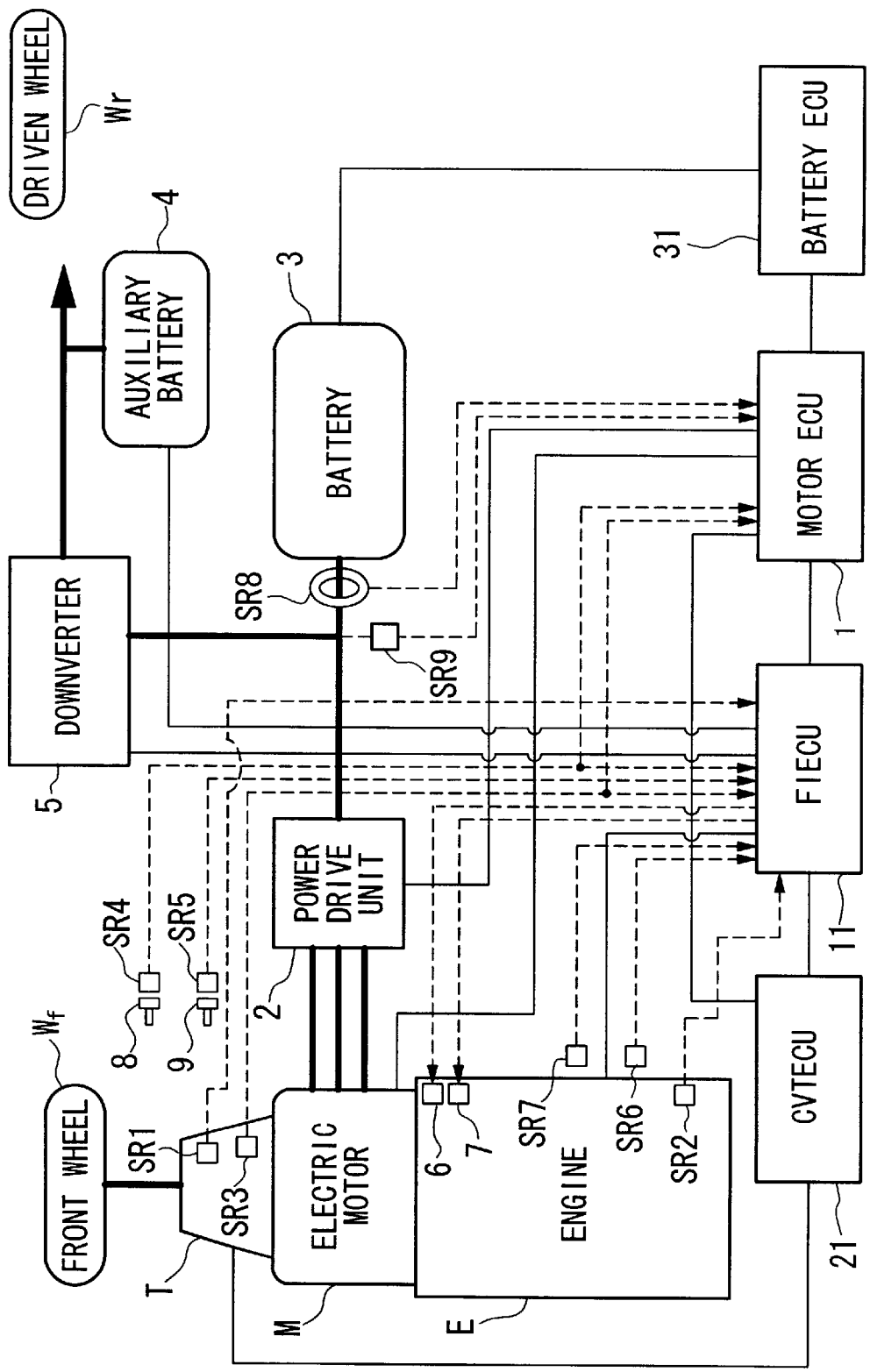
FIG. 6 is a block diagram illustrating a construction of a hybrid vehicle to which a second embodiment of the present invention is applied.

Hereinafter, the second embodiment of the present invention will be explained referring to FIGS. 6 to 9. FIG. 6 is a block diagram illustrating a parallel hybrid vehicle in which the second embodiment of the present invention is applied. In FIG. 6, elements which are substantially identical to those in FIG. 1 are denoted by the same referential symbols.

The vehicle comprises, as a power source for driving the vehicle, an engine E for generating the driving force for the vehicle, and an electric motor M for assisting the driving force of the engine E. The driving force generated by both the engine E and electric motor M is transmitted via automatic or manual transmission T to the driving wheels Wf.

When the vehicle is idling or cruising, the engine E rotates the electric motor M, and the motor M generates electric power as a power generator to charge the battery 3. When the vehicle decelerates, the driving force is transmitted from the driving wheels Wf to the electric motor M, the electric motor M functions as a generator for generating a regenerative braking force, that is, the kinetic energy of the vehicle body is recovered as electric energy.

The driving of the motor M and the regenerating operation of the motor M are controlled by a power drive unit 2 according to control command from a motor ECU 1. A high voltage battery 3 for sending and receiving electric energy to and from the motor M is connected to the power drive unit 2. The battery 3 includes a plurality of modules connected in series, and in each module, a plurality of cells are connected in series. The hybrid vehicle includes a 12-V auxiliary battery 4 for driving various accessories. The auxiliary battery 4 is connected to the battery 3 via a downverter 5. The downverter 5 is controlled by an FIECU 11, and reduces the voltage from the battery 3 to charge the auxiliary battery 4.

The motor ECU 1 controls the driving condition of the electric motor M under the control by the FIECU 11. An electric current sensor SR8 and a voltage sensor SR9 are provided for measuring the electric current and voltage supplied from the battery 3, and the outputs of these sensors SR8 and SR9 are input to the motor ECU 1. The motor ECU 1 controls the power drive unit 2 in accordance with the signals from the sensors SR8 and SR9.

The motor ECU 1 corresponds to the power generation control apparatus according to the present invention. That is, the motor ECU 1 not only controls the drive of the motor M as described above, but also functions as a start detection device for detecting the start of the vehicle from an idling state, and as a power generation limiting device for temporarily limiting the power generation by the motor M when the start detection device detects the start of the vehicle.

FIECU 11 controls, in addition to the motor ECU 1 and the downverter 5, a fuel supply amount controller 6 for controlling the amount of fuel supplied to the engine E, a starter motor 7, ignition timing, etc. Therefore, the FIECU 11 receives (i) a signal from a speed sensor SR1 for detecting the vehicle speed based on the rotation of the drive shaft of the transmission T, (ii) a signal from an engine (rotational) speed sensor SR2 for detecting the engine (rotational) speed, (iii) a signal from a neutral switch SR3 for detecting whether the shift position of the transmission T is neutral, (iv) a signal from a brake switch SR4 for detecting the operation of a brake pedal 8, (v) a signal from a clutch switch SR5 for detecting the operation of a clutch pedal 9, (vi) a signal from a throttle opening-degree sensor SR6 for detecting the degree of opening TH of the throttle (valve), and (vii) a signal from an air-intake passage pressure sensor SR7 for detecting the air-intake passage (negative) pressure PB.

In FIG. 6, a CVTECU 21 controls the CVT (continuously variable transmission), and a battery ECU 31 protects the battery 3 and calculates the remaining capacity of the battery 3.

Referring to the flowchart shown in FIG. 7, the power generation control method by the motor ECU 1 (power generation control apparatus) will be explained.

Figure 7:
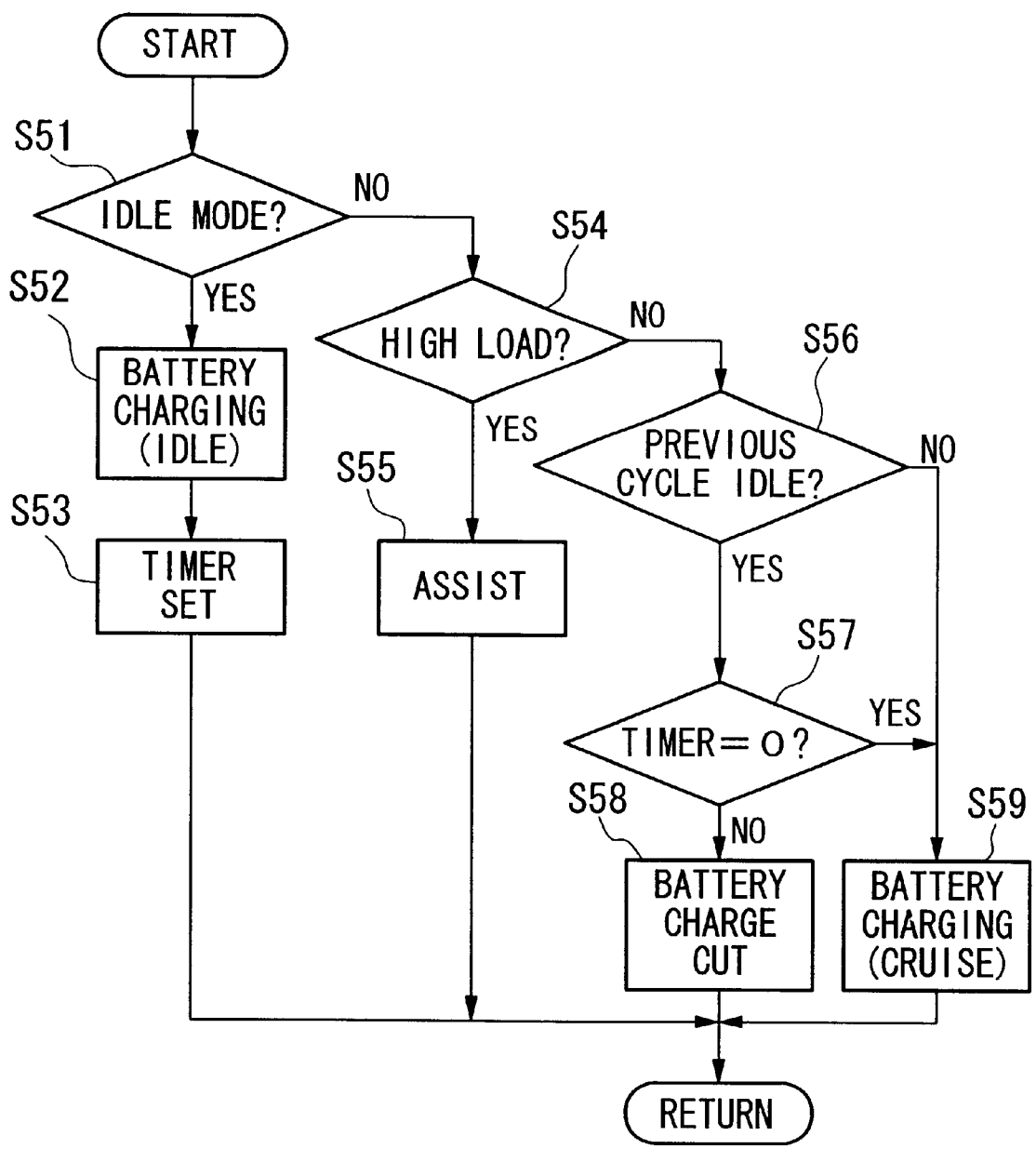
FIG. 7 is a flowchart illustrating steps for controlling the power generation amount according to second embodiment.

The flow in FIG. 7 is repeated at a predetermined interval (for example, at a millisecond ordered time period) in order to perform the control in accordance with a driving condition when the vehicle starts.

First, in step S51, it is determined whether the present mode is the idle mode. That is, it is determined whether the vehicle is in an idling state based on information such as air intake passage pressure, engine speed, and the degree of throttle opening. If the present mode is determined to be the idle mode, the flow proceeds to step 52.

In step S52, the electric motor M is driven by the engine E under the control by the motor ECU 1 to generate electric power, and the battery 3 is charged using the electrical power.

Next, the flow proceeds to step S53, the operating time of a timer (not shown in the figures) is set to a predetermined time period, for example, 0.5 to 1 second. While the timer counts this time period, the charging of the battery 3 and the power generation by the motor M can be temporarily stopped under a predetermined condition. So far as the idle mode is maintained, steps S51 to S53 are repeated, the charging of the battery 3 is continued and the timer is repeatedly set with a new time period. If the idle mode is stopped, the remainder time in the timer decreases as time passes.

When the driver starts the vehicle, the motor ECU 1 (start detecting device) detects the starting operation. Then, in step S51, it is judged that the vehicle is not in the idle mode, and the flow proceeds to step S54.

In step S54, it is determined whether a high load is applied to the engine E. If the load applied to the engine E when starting the vehicle is so high that power assistance by the motor M is necessary, it is determined that a high load is being applied to the engine E.

Figure 8A:
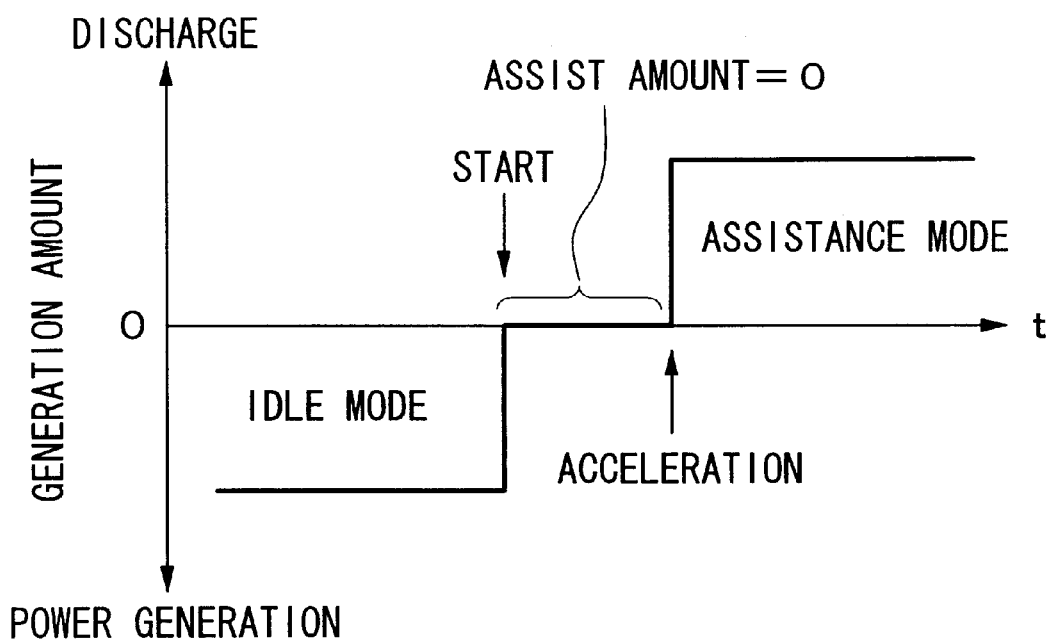
FIG. 8A and FIG. 8B are graphs for explaining the function of the second embodiment.

In the case where it is determined that a high load is being applied to the engine E in step S54, the flow proceeds to step S55. In step S55, as shown in FIG. 8A, the driving mode is shifted from the idle mode to the assistance mode in which the output of the engine E is assisted by the electric motor M. However, just after shifting to the assistance mode, the assistance amount is temporarily set to "0" for a predetermined short period of time, and, during this period, only electric power required by the engine E is supplied from the battery 3. After the period is over, the assistance amount is set to a suitable value so that the assistance of the output of the engine E is suitably assisted by the motor M. In this way, when a high load is applied to the engine E, the power generation by the motor M is stopped, and the assistance of the engine output is performed.

In the case where it is determined that a high load is not being applied to the engine E in step S54, the flow proceeds to step S56. When it is determined that a high load is not being applied to the engine E in step S54, the driving mode is a non assistance modes which is accompanied with power generation by the motor M. Therefore, based on this determination in step S54, the starting operation for switching the state from the idle mode to the driving mode accompanied with power generation is detected.

In step S56, it is determined whether the vehicle was in an idle mode at the time of the previous cycle. That is, if the present mode was determined not to be the idle mode in step S51 in the present cycle, it is then determined whether it was the idle mode in step S51 in the previous cycle, so as to determine whether the present state in a non-assistance mode is a starting state or a cruising state after a starting state.

In the case where, the present mode is determined not to be the idle mode in step S51 in the present cycle, it is determined in step S54 that a high load is not applied to the engine E, and it is determined in step S56 that the previous cycle was in the idle mode, then, the present state is determined to be a starting state in a non-assistance mode, and the flow proceeds to step 57. In contrast, in the case where the present mode is determined not to be the idle mode in step S51 in the present cycle, it is determined in step S54 that a high load is not being applied to the engine E, and it is determined in step S56 that the previous cycle was not in the idle mode, then, the present state is determined to be a cruising state after a starting state.

Next, in step S57, it is determined whether the remainder time in the timer is "0" or not. That is, it is determined whether the period of time set in the timer has elapsed since the idle mode ended.

Figure 8B:
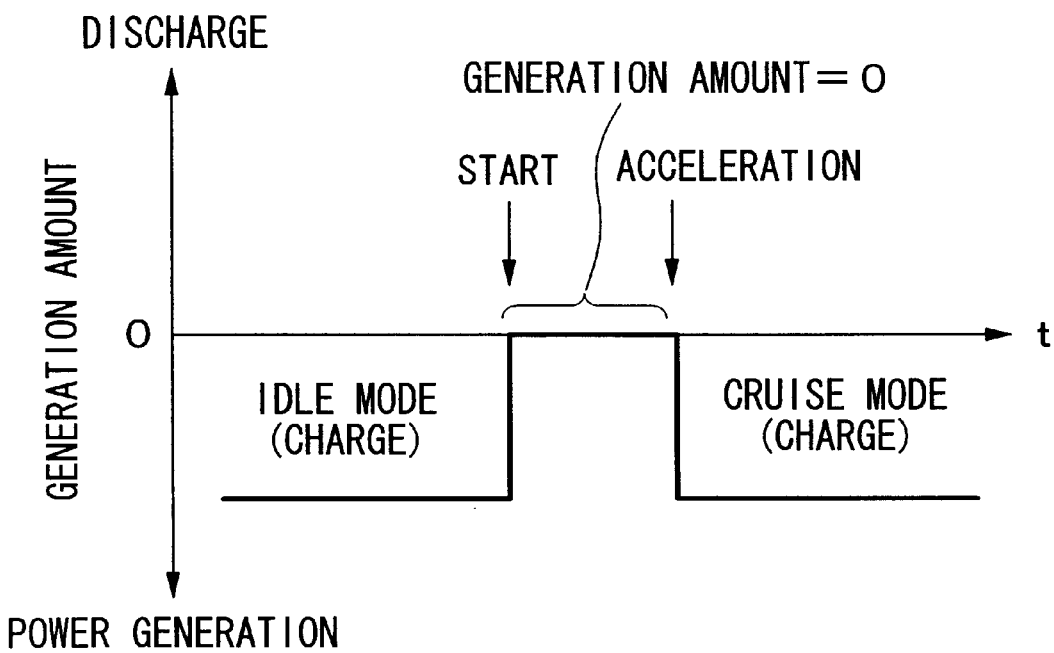

When in step S57 the determination is NO, that is, when the period of time set in the timer has not elapsed yet, the charging of the battery 3 is stopped. That is, as shown in FIG. 8B, the power generation by the motor M is temporarily stopped for a period of time when shifting the driving mode from an idle mode to a non-assistance mode accompanied with battery charging. By decreasing the amount of the power generation to "0", the torque applied to the engine E by the motor M for generating electric power decreases. Therefore, the output of the engine E is effectively used for accelerating the vehicle, the stating of the vehicle is smoothly performed. Thus, the toughness of the engine E is improved, the margin of the output of the engine E is enlarged, and the acceleration when starting vehicle can be improved.

The charging of the battery 3 is halted until the driving mode during the previous cycle is determined not to be an idle mode in step S56, or until the remainder time in the timer is determined to be "0" in step S57. That is, if the mode of the previous cycle is determined to be an idle mode, the charging of the battery 3 is halted for a predetermined period of time set in the timer (for example, 0.5 to 1 second). Therefore, the power generation is temporarily halted when starting the vehicle, and after that, the power generation is started under normal control.

In the case where the driving mode during the previous cycle is determined not to be an idle mode in step S56, or in the case where the remainder time in the timer is determined to be "0" in step S57, the flow proceeds to step S59, the battery 3 is charged. That is, the engine E which is driven in a non-assistance mode activates the motor M to generate electric power, and the battery 3 is charged using the generated electric power.

In addition to the above-mentioned assistance mode and non-assistance mode, as another driving mode, there is a regeneration mode for decelerating the vehicle. However, because the deceleration of the vehicle is not performed when starting the vehicle, there is no occasion in which the driving mode is shifted to the regeneration mode during the starting operation. Therefore, it is not necessary to consider the regeneration mode for controlling power generation at the time of starting the vehicle.

To sum up the above operations, when the drive mode is shifted from the idle mode accompanied with battery charging to the non-assistance mode similarly accompanied with battery charging (from NO in step S51 to NO in step S54), until the period of time set in the timer elapses, the charging of the battery 3 is forcibly halted, and the generation amount by the motor M temporarily decreases. Therefore, the load applied to the engine E is diminished when starting the vehicle, and the smoothness of the start can be improved.

Figure 9:
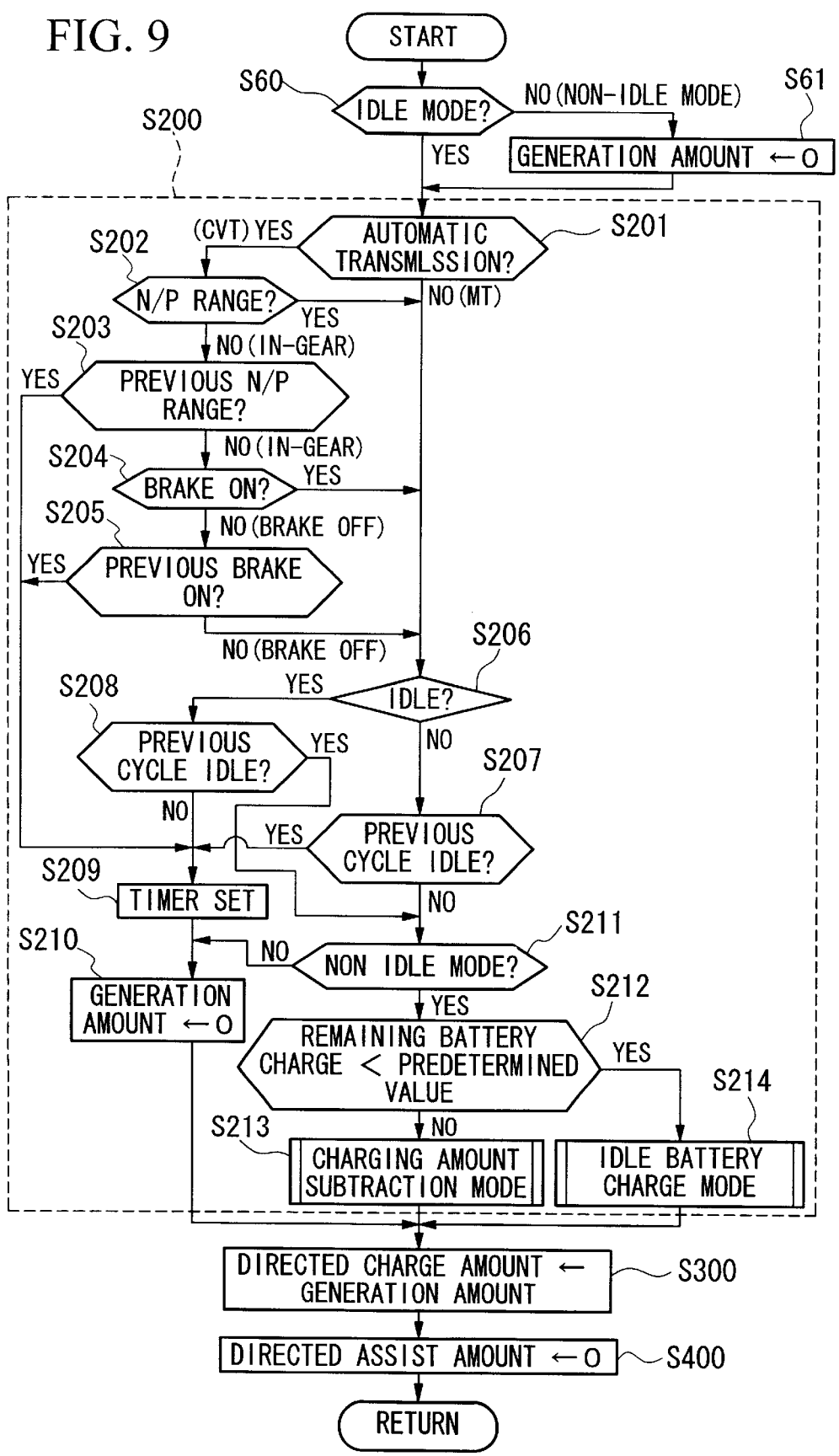
FIG. 9 is a flowchart illustrating steps for controlling the power generation amount according to the second embodiment.

Next, referring to FIG. 9, another embodiment of the present invention which can suppress the generation amount when in the idle mode will be explained.

First, in step S60, it is determined whether the present mode is the idle mode. If it is the idle mode ("YES" in step S60), the flow proceeds to step 200 which is characteristic of the present invention. If it is not the idle mode, after the generation amount is set to "0" in step S61, the flow proceeds to step 200.

In step 200, steps S201 to S214 are carried out so as to control the generation amount based on the detection of the start operation of the vehicle. According to this embodiment, in the case of an automatic transmission vehicle, the stating operation of the vehicle is detected base on the change of a gear position and release of a brake, in the case of a manual transmission vehicle, the starting operation is detected based on the change of the driving mode between the idle mode and other modes.

In step S201, it is determined whether it is an automatic transmission vehicle (for example, a CVT (Continuously Variable Transmission) car).

If it is an automatic transmission vehicle, the flow proceeds to step S202, and it is determined whether or not the gear position in the present cycle is in the N-range (neutral range); or in the P-range (parking range).

When the gear position is neither in the N-range nor the P-range in step S202, it is next determined whether or not the gear position in the previous cycle was in the N-range or the P-range (hereinafter, "N-range or P-range" is referred as "N/P range" ). If the gear position in the present cycle is not in the N/P range in step S202, and the gear position in the previous cycle was the N/P range in step S203, it is determined that a starting operation was carried out by shifting the gear position to an in-gear state, and the flow proceeds to step S209.

In contrast, if the gear position in the previous cycle was not the N/P range ("NO" in step S203), it is determined whether the brake is being operated to be an ON state in the present cycle. If the brake operation in the present cycle is not in the ON state ("NO" in step S204), it is further determined whether the brake in the previous cycle was in the ON state.

If the brake operation in the present cycle is not in the ON state ("NO" in step S204, and the brake operation in the previous cycle was in the ON state ("YES" in step S205), it is determined that the starting operation is carried out by releasing the brake, and the flow proceeds to step S209.

When the gear position is determined to be the N/P range in step S202 ("YES" in step S202), or when the brake operation is in the ON state in step S204 ("YES" in step S204), or when the brake is not in the ON state in step 205 ("NO" in step S205), it is determined that the starting operation has not been carried out, and the flow proceeds to step S206.

If the vehicle is determined not to be an automatic transmission car in step S201 ("NO" in step S201), or if the starting operation is not detected in steps S202 to S205, it is determined in steps S206 to S208 whether or not the driving mode has changed between the idle mode and the other modes.

In step S206, it is determined whether the present cycle is in the idle mode. When the present cycle is not in the idle mode ("NO" in step S206), the flow proceeds to step S207, and it is determined whether the previous cycle was in the idle mode. If the present cycle is not in the idle mode ("NO" in step S206), and the previous cycle was in the idle mode ("YES" in step S207), it is determined that the starting operation was carried out by switching the driving mode from the idle mode to the other driving mode (running mode), and the flow proceeds to step S209.

When in step S206 it is determined that the present cycle is in the idle mode ("YES" in step S206), the flow proceeds to step S208, and it is determined whether the previous cycle was in the idle mode. If the present cycle is in the idle mode ("YES" in step S206) and the previous cycle was not in the idle mode, the flow proceeds to step S209. In this way, even in the case where the driving mode is switched to the idle mode from the other mode, the generation amount by the motor M is suppressed. A concrete case in which the driving mode is switched to the idle mode from another mode is, for example, the case where a running vehicle stops. In such a case, in the process from deceleration to the stopping of the vehicle, there is a tendency that the load applied to the engine E becomes excessive. In order to prevent this, the present embodiment temporarily decreases the generation amount by the motor M even in the process from deceleration to the stopping of the vehicle. Therefore, the reliability in preventing engine stall can be improved.

When the starting operation is detected in steps S201 to S208, a timer is set with a predetermined period of time (timer value) in step S209. This timer value corresponds to a period of time in which the power generation is to be suppressed.

Next, in step S210, the generation amount by the motor M is set to "0". That is, the charging of the battery 3 is halted as was previously stated. Thus, because the load applied on the engine E for generating power is omitted, the output of the engine is effectively used for driving the vehicle, and a smooth start is possible.

On the other hand, if the driving mode is not changed between the previous cycle and the present cycle, for example, if it is determined in step S207 that the previous cycle was not in the idle mode ("NO" in step S207), or if it is determined in the step S208 that the previous cycle was in the idle mode ("YES" in step S208), the flow proceeds to step S211.

In step S211, it is determined whether the present cycle is in a mode other than the idle mode, and if the determination is YES, the flow proceeds to step S212. In step S212, the remaining battery charge is compared with a predetermined value, and if the remaining battery charge is less than the predetermined value ("YES" in step S212), the flow proceeds to step S214 to charge the battery 3. If the remaining battery charge is no less than the predetermined value ("NO" in step S212), the flow proceeds to step S213 to enter a charging amount subtraction mode.

As is explained above, when transition from the idling state to the starting state is detected, the generation amount is set to "0".

The generation amount is set by the above procedures, the following procedures are carried out to produce a charge command and an assistance command, and the driving state of the electric motor M is controlled.

In step S300, the value of the charge command is set to the generation amount determined in step S200, and the battery charging is performed in accordance with the generation amount. Therefore, when the generation amount has been set to "0" in step S210, the value of the charge command is also set to "0", and the charging of the battery 3 is completely stopped when starting the vehicle.

Furthermore, in step S400, the value of the assistance command is set to "0", the motor is controlled so that assistance of the engine E is not performed when starting the vehicle.

As is explained above, according to the embodiment shown in FIG. 9, the detection of the starting operation is performed in the idle mode, and if any action for a starting operation is detected, the generation amount is temporarily suppressed. Furthermore, the values of the charge command and the assistance command are respectively output in accordance with the generation amount. Therefore, the power generation by the motor M is temporarily suppressed when starting the vehicle, and the start of the vehicle can be smooth.

The present invention is not limited to the above-described embodiments, but includes various modifications which follow the concept of the present invention. For example, although the foregoing embodiments determine whether it is the driving mode (non-assistance mode) accompanied with power generation, based on the detection of the idle mode and the state of the load applied to the engine, instead of this, the present invention may use another means for detecting a starting operation during the idle mode.

Additionally, the above embodiments halt the charging of the battery 3 so as to suppress the generation amount; however, another means for suppressing the generation amount may be applied in the present invention.

Furthermore, the above embodiments suppress the generation amount when the driving mode is shifted from the idle mode to the non-assistance mode; however, the present invention can be applied to any cases in which the driving mode is shifted from the idle mode to any mode accompanied with power generation.

What is claimed is:

1. A power generation control apparatus for a hybrid vehicle, comprising:

a detection device which detects a state of the hybrid vehicle in which a torque load to be applied to an engine of the hybrid vehicle should be decreased; and a generation amount control device which decreases the generation amount to be generated by a motor when the state of the hybrid vehicle is detected.

2. A power generation control apparatus according to claim 1, wherein the detection device comprises:

a load torque calculation device which calculates load torque to be applied to the engine of the hybrid vehicle for generating electrical power used in the hybrid vehicle when the engine is idling;

a generable torque calculation device which calculates torque generable by the engine when the engine is idling; and a power generation load torque determination device which determines a limiting value of a power generation load torque to be applied to the engine in accordance with the load torque calculated by the load torque calculation device and the generable torque calculated by the generable torque calculation device.

3. A power generation control apparatus according to claim 1, wherein:

the detection device detects if the state of the engine has been shifted from an idling state to a non-idling state; and the generation amount control device temporarily decreases the generation amount to be generated by the motor when the state of the engine is detected to have been shifted from the idling state to the non-idling state.

4. A power generation control apparatus according to claim 3, wherein the detection device detects a starting operation for shifting a state of the engine from an idling state to a running state accompanied with power generation.

5. A power generation control apparatus according to claim 3, wherein the generation amount control device temporarily halts charging of the power storage unit so as to decrease the generation amount by the motor.

6. A hybrid vehicle comprising:

an engine which outputs a driving force for the hybrid vehicle;

a motor which outputs an assistant driving force so as to assist the driving force of the engine;

a power storage unit which supplies electric power to the motor when the assistant driving force is necessary, and which stores electric power generated by the motor when the assistant driving force is not necessary; and a power generation control apparatus which controls the power generation by the motor;

wherein the power generation control apparatus comprises:

a detection device which detects a state of the hybrid vehicle in which a torque load to be applied to an engine of the hybrid vehicle should be decreased; and a generation amount control device which decreases the generation amount to be generated by a motor when the state of the hybrid vehicle is detected.

7. A hybrid vehicle according to claim 6, wherein the detection device comprises:

a load torque calculation device which calculates load torque to be applied to the engine of the hybrid vehicle for generating electrical power used in the hybrid vehicle when the engine is idling;

a generable torque calculation device which calculates torque generable by the engine when the engine is idling; and a power generation load torque determination device which determines a limiting value of a power generation load torque to be applied to the engine in accordance with the load torque calculated by the load torque calculation device and the generable torque calculated by the generable torque calculation device.

8. A hybrid vehicle according to claim 6, wherein:

the detection device detects if the state of the engine has been shifted from an idling state to a non-idling state; and the generation amount control device temporarily decreases the generation amount to be generated by the motor when the state of the engine is detected to have been shifted from the idling state to the non-idling state.

9. A power generation control method for a hybrid vehicle, which has an engine which outputs a driving force for the hybrid vehicle, a motor which outputs an assistant driving force so as to assist the driving force of the engine, and a power storage unit which supplies electric power to the motor when the assistant driving force is necessary and which stores electric power generated by the motor when the assistant driving force is not necessary, the power generation control method comprising:

a first step of detecting a state of the hybrid vehicle in which a torque load to be applied to an engine of the hybrid vehicle should be decreased; and a second step of decreasing the generation amount to be generated by a motor when the state of the hybrid vehicle is detected.

10. A power generation control method according to claim 9, wherein:

the first step comprises detecting if the state of the engine has shifted from an idling state to a non-idling state; and the second step comprises temporarily decreasing the generation amount to be generated by the motor when the state of the engine is detected to have been shifted from the idling state to the non-idling state.

11. A power generation control method according to claim 10, wherein the non-idling state is a starting state of the hybrid vehicle.

12. A power generation control method according to claim 10, wherein a starting operation for shifting a state of the engine from an idling state to a running state accompanied with power generation is detected in the first step.

13. A power generation control method according to claim 10, wherein charging of the power storage unit is temporarily halted so as to decrease the generation amount by the motor in the second step.

* * * * *

UNITED STATES PATENT AND TRADEMARK OFFICE
CERTIFICATE OF CORRECTION

PATENT NO. : 6,362,536 B1  Page 1 of 1
DATED : March 26, 2002
INVENTOR(S) : Izumiura et al.

It is certified that error appears in the above-identified patent and that said Letters Patent is hereby corrected as shown below:

<u>Title page,</u>
Item [*] Notice, "0 days" should be -- 51 days --.

Signed and Sealed this

Fifth Day of November, 2002

Attest:

Attesting Officer

JAMES E. ROGAN
*Director of the United States Patent and Trademark Office*